United States Patent
Wu et al.

(10) Patent No.: US 8,352,669 B2
(45) Date of Patent: Jan. 8, 2013

(54) BUFFERED CROSSBAR SWITCH SYSTEM

(75) Inventors: Ephrem Wu, San Mateo, CA (US); Ting Zhou, Alameda, CA (US); Steven Pollock, Allentown, PA (US)

(73) Assignee: LSI Corporation, Milpitas, CA (US)

( * ) Notice: Subject to any disclaimer, the term of this patent is extended or adjusted under 35 U.S.C. 154(b) by 553 days.

(21) Appl. No.: 12/430,438

(22) Filed: Apr. 27, 2009

(65) Prior Publication Data
US 2010/0272117 A1    Oct. 28, 2010

(51) Int. Cl.
*G06F 13/00* (2006.01)
(52) U.S. Cl. .............................. 710/317; 710/242
(58) Field of Classification Search ............... 710/36, 710/38, 40, 51, 316, 317, 240–244
See application file for complete search history.

(56) References Cited

U.S. PATENT DOCUMENTS

| | | | |
|---|---|---|---|
| 4,314,367 A | | 2/1982 | Bakka et al. |
| 4,982,187 A | | 1/1991 | Goldstein et al. |
| 5,623,698 A | * | 4/1997 | Stephenson et al. ............ 710/38 |
| 5,892,766 A | * | 4/1999 | Wicki et al. .................... 370/412 |
| 5,943,283 A | * | 8/1999 | Wong et al. ................ 365/230.01 |
| 6,195,335 B1 | * | 2/2001 | Calvignac et al. ............. 370/236 |
| 6,636,932 B1 | * | 10/2003 | Regev et al. ................... 710/317 |
| 6,888,841 B1 | | 5/2005 | Ozaki |
| 6,999,413 B2 | * | 2/2006 | Moriwaki et al. ............. 370/228 |
| 7,089,346 B2 | * | 8/2006 | Cebulla et al. ................ 710/317 |
| 7,234,018 B1 | * | 6/2007 | Purcell et al. ................. 710/317 |
| 7,596,142 B1 | * | 9/2009 | MacAdam .................... 370/392 |
| 7,826,434 B2 | * | 11/2010 | Goldrian et al. .............. 370/338 |
| 2003/0123468 A1 | * | 7/2003 | Nong ............................. 370/412 |
| 2005/0027920 A1 | * | 2/2005 | Fitzsimmons et al. ........ 710/317 |
| 2005/0152352 A1 | * | 7/2005 | Jun et al. ....................... 370/388 |
| 2006/0256783 A1 | * | 11/2006 | Ayrapetian et al. ........... 370/360 |
| 2010/0260198 A1 | * | 10/2010 | Rojas-Cessa et al. ........ 370/417 |

FOREIGN PATENT DOCUMENTS

EP    1414252    4/2004

OTHER PUBLICATIONS

Rojas-Cessa, et al. "CIXOB-k: Combined Input-Crosspoint-Output Buffered Packet Switch", IEEE Global Telecommunications Conference 2001 vol. 4, Issue 2001, pp. 2654-2660, Nov. 2001.

Rojas-Cessa, et al. "CIXB-1: Combined Input-One-cell-Crosspoint Buffered Switch", IEEE Workshop on High Performance Switching and Routing 2001, pp. 324-329, May 2001.

Rojas-Cessa, et al. "On the Maximum Throughput of a Combined Input-Crosspoint Buffered Packet Switch", IEICE Transactions on Communications, vol. E89-B, No. 11, pp. 3120-3123, Nov. 2006.

(Continued)

*Primary Examiner* — Khanh Dang (57) ABSTRACT

Described embodiments provide for transfer of data between data modules. At least two crossbar switches are employed, where input nodes and output nodes of each crossbar switch are coupled to corresponding data modules. The ith crossbar switch has an $N_i$-input by $M_i$-output switch fabric, wherein $N_i$ and $M_i$ are positive integers greater than one. Each crossbar switch includes an input buffer at each input node, a crosspoint buffer at each crosspoint of the switch fabric, and an output buffer at each output node. The input buffer has an arbiter that reads data packets from the input buffer according to a first scheduling algorithm. An arbiter reads data packets from a crosspoint buffer queue according to a second scheduling algorithm. The output node receives segments of data packets provided from one or more corresponding crosspoint buffers.

13 Claims, 6 Drawing Sheets

OTHER PUBLICATIONS

Guo, et al. "Framed Round-Robin Arbitration with Explicit Feedback Control for Combined Input-Crosspoint Buffered Packet Switches", IEEE International Conference on Communications 2006, Jun. 11-15, 2006.

Guo, et al. "Combining Distributed and Centralized Arbitration Schemes for Combined Input-Crosspoint Buffered Packet Switches" IEEE International Conference on Networks, Nov. 2005.

Minkenberg, Cyriel, "Integrating Unicast and Multicast Traffic Scheduling in a Combined Input- and Output-Queued Packet-Switching System," Proceedings of the Ninth International Conference on Computer Communications and Networks, Oct. 16-18, 2000, pp. 127-134, IEEE (USA 2000).

Pan, Deng and Yang, Yuanyuan, "FIFO-based Multicast Scheduling Algorithm for Virtual Output Queued Packet Switches," IEEE Transactions on Computers, vol. 54, No. 10, pp. 1283-1297, Oct. 2005 (USA).

* cited by examiner

BUFFERED CROSSBAR SWITCH SYSTEM

BACKGROUND OF THE INVENTION

1. Field of the Invention

The present invention relates to a buffered crossbar switch for inter-connection between multiple modules in a communication system.

2. Description of the Related Art

A crossbar switch (also known as a "crosspoint switch" or a "matrix switch") inter-connects a plurality of input ports and output ports to each other. A crossbar switch having P inputs and Q outputs has a switch fabric matrix with P×Q crosspoints where connections between input ports and output ports are made. Thus, packets arriving at one of the input ports might be routed to one or more specified output ports. For example, a packet might be routed to just a single specified output port (unicast), routed to all output ports (broadcast), or routed to multiple specified output ports (multicast).

Bufferless crossbar switches are frequently used in multi-processor computer systems to link processors with other resources, such as memory or other subsystems, or with internet switches or other high-performance communication networks. However, bufferless crossbar switches generally require switch fabric speedup, meaning that the internal data rate of the switch must be higher than the data rate of the link. These crossbar switches typically require high-complexity centrally-controlled scheduling algorithms to achieve 100% throughput, such as the Parallel Iterative Matching (PIM) and iSLIP algorithms.

In a buffered crossbar switch, buffers are included in the crossbar switch to temporarily store packets that cannot be routed to a specified output port instantly (i.e., blocked packets). For example, buffers might be provided for each input port, for each output port, for each crosspoint connection of the crossbar switch, or some combination thereof. Centrally-controlled scheduling algorithms might be employed to allow the input and output data streams to efficiently access the switch fabric.

SUMMARY OF THE INVENTION

In an exemplary embodiment, the present invention provides for transfer of data between data modules. Each data module is at least one of a data processing module and a data storage module. At least two coupled crossbar switches are employed and input nodes and output nodes of each of the crossbar switches are coupled to corresponding data modules. The ith crossbar switch has an $N_i$-input node by $M_i$-output node switch fabric, wherein $N_i$ and $M_i$ are each positive integers greater than one. Each crossbar switch includes an input buffer at each input node, a crosspoint buffer at each crosspoint of the switch fabric, and an output buffer at each output node. The input buffer has an input arbiter that reads data packets from the input buffer in accordance with a first scheduling algorithm. The crosspoint buffer provides a queue having an output arbiter that reads data packets from the crosspoint buffer queue in accordance with a second scheduling algorithm. The output node receives segments of data packets provided from one or more corresponding crosspoint buffers.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In accordance with embodiments of the present invention, a buffered crossbar switch system is provided for a high-throughput interconnection between multiple data modules in a communication system. For example, through distributed buffering and scheduling algorithms in the crossbar switch, embodiments of the present invention might be used to create concurrent virtual pipelines to interconnect multi-core processors with memory subsystems. Embodiments of the present invention might alternatively be used as, for example, client-server switches, internet routers, shared memory systems, or network switches. Embodiments of the present invention might achieve 100% throughput without speedup.

Figure 1:
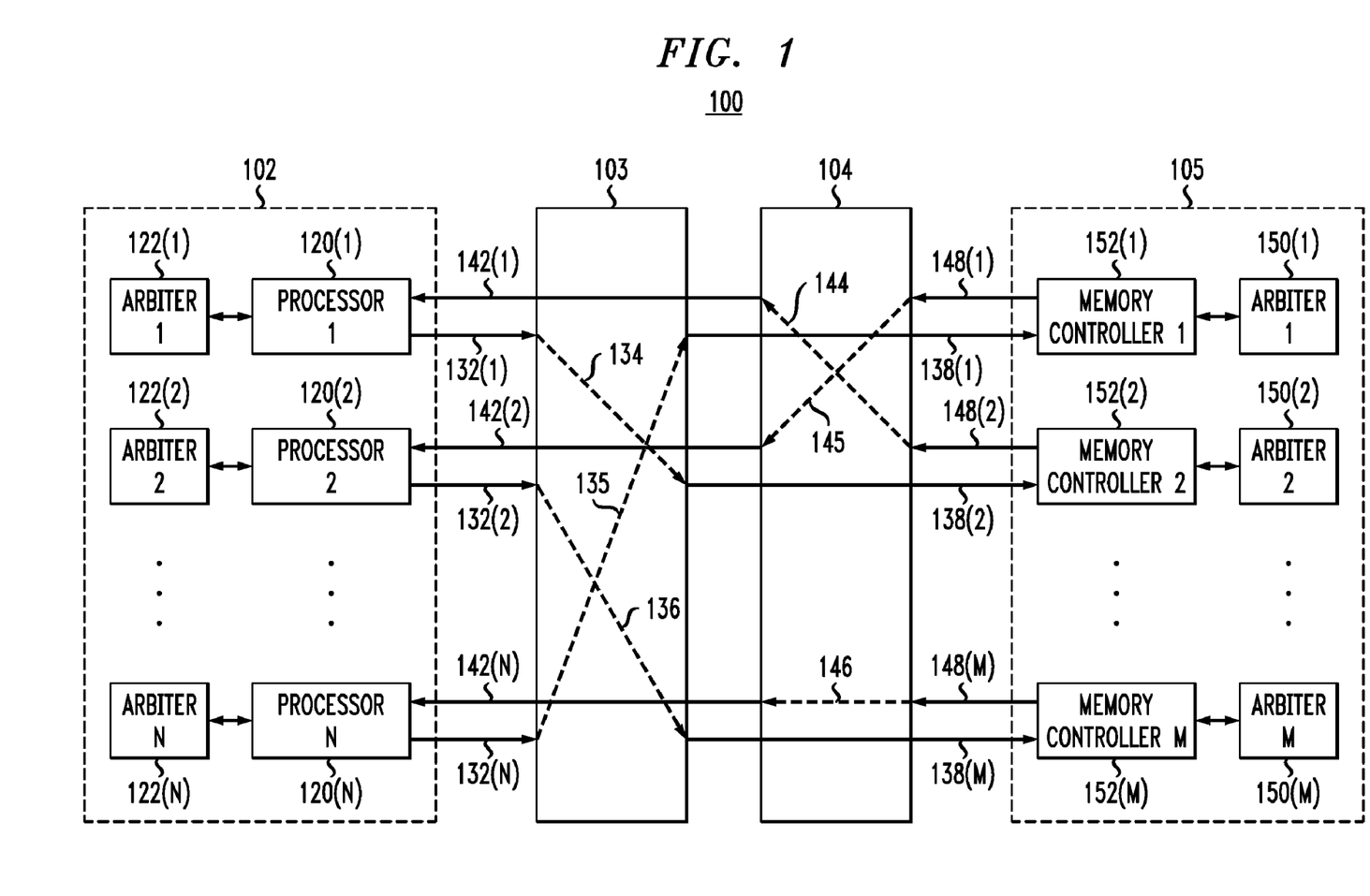
FIG. 1 shows a block diagram of a buffered crossbar switch system operating in accordance with exemplary embodiments of the present invention.

FIG. 1 shows a block diagram of exemplary buffered crossbar switch system 100. As shown, buffered crossbar switch system 100 comprises processing unit 102, buffered crossbar switches 103 and 104, and memory unit 105. Buffered crossbar switches 103 and 104 are each in electrical communication with processing unit 102 and memory unit 105. Thus, as shown, buffered crossbar switches 103 and 104 might be configured to implement a high-throughput interconnection between multiple data modules within processing unit 102 and memory unit 105. In some embodiments, buffered crossbar switches 103 and 104 might be on one or more chips in communication with processing unit 102 and memory unit 105 via optical fiber.

In some embodiments, processing unit 102 might be a multi-core processor. For example, processing unit 102 might include N processors, where N is an integer greater than or equal to 1. As shown in FIG. 1, processing unit 102 includes processor 120(1), processor 120(2), and so on, through the Nth processor 120(N). Processors might be, for example, implemented as general-purpose processors, such as PowerPC or ARM processors, or the processors might be, for example, implemented as accelerators for specialized functions such as digital signal processing or security protocol processing. Processing unit 102 also includes arbiter 122(1), arbiter 122(2), and so on, through the Nth arbiter 122(N). As shown in FIG. 1, processor 120(1) is in electrical communication with arbiter 122(1), processor 120(2) is in electrical communication with arbiter 122(2) and so on, through processor 120(N) that is in electrical communication with arbiter 122(N). Each of arbiters 122(1) through 122(N) has at least one input port and one output port for communication with processors 120(1) through 120(N), respectively.

In some embodiments, memory unit 105 might employ memory controllers for coordination of reading and writing operations with memory. Memory might include, for example, at least one RAM buffer. Therefore, as shown in the exemplary embodiment, memory unit 105 might include M memory controllers for coordination of reading information from, and writing information to, one or more RAM buffers, where M is an integer greater than or equal to 1. Values for N and M might be equal, but are not necessarily equal. Memory is not limited to only a RAM buffer, and might be implemented with one or more other types of memory, such as flash memory. Memory unit 105 includes memory controllers 152(1) through memory controller 152(M). Memory unit 105 also includes arbiters 150(1) through arbiter 150(M). As shown in FIG. 1, memory controller 152(1) is in electrical communication with arbiter 150(1), memory controller 152(2) is in electrical communication with arbiter 150(2), and so on, through memory controller 152(M) that is in electrical communication with arbiter 150(M). Each of arbiters 150(1) through 150(M) has at least one input port and one output port for communication with memory controllers 152(1) through 152(M), respectively. Embodiments of the present invention might alternatively include a centralized arbiter for output arbitration. Other embodiments of the present invention might include a combination of localized and centralized arbiters.

Buffered crossbar switches 103 and 104 include a switch fabric configured to allow any input to the switch to be transferred to any one or more outputs of the switch. In exemplary embodiments, buffered crossbar switch 103 has N input ports and M output ports, and buffered crossbar switch 104 has M input ports and N output ports, where N is the number of processors and M is the number of memory controllers. As shown in FIG. 1, buffered crossbar switch 103 has N input ports, shown as 132(1) through 132(N), and M output ports, shown as 138(1) through 138(M). Buffered crossbar switch 104 has M input ports, shown as 148(1) through 148(M), and N output ports, shown as 142(1) through 142(N). While two buffered crossbar switches are shown in FIG. 1, the present invention is not so limited, and, thus, buffered crossbar switch system 100 might include up to B buffered crossbar switches, where B is an integer greater than or equal to 1.

Figure 6:
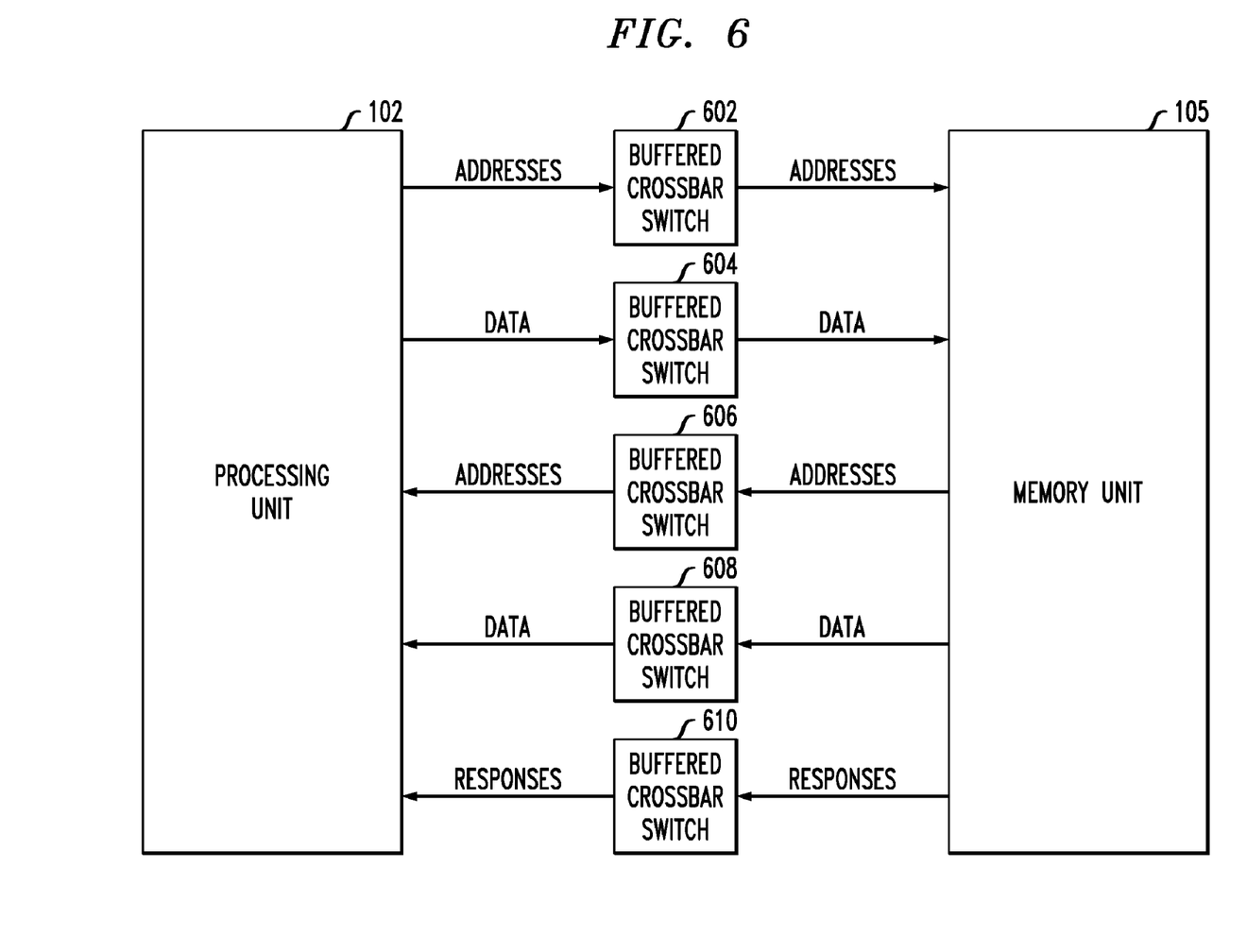

For example, an exemplary embodiment of the present invention, such as shown in FIG. 6, might include 5 buffered crossbar switches: one switch (shown as buffered crossbar switch 602) to send addresses from processing unit 102 to memory unit 105, one switch (shown as buffered crossbar switch 604) to send data from processing unit 102 to memory unit 105, one switch (shown as buffered crossbar switch 606) to send addresses from memory unit 105 to processing unit 102, one switch (shown as buffered crossbar switch 608) to send data from memory unit 105 to processing unit 102, and one switch (not shown as buffered crossbar switch 610) to send responses from the memory to the processors.

As shown in FIG. 1, buffered crossbar switch 103 is configured to switch data sent from processing unit 102 to memory unit 105, and buffered crossbar switch 104 is configured to switch data sent from memory unit 105 to processing unit 102. Thus, buffered crossbar switches 103 and 104 might be used to set which ones of N processors of processing unit 102 are in communication with which ones of the M memory controllers of memory unit 105. For example, data provided from processor 120(1) of processing unit 102 might be provided to input port 132(1) of buffered crossbar switch 103. Arbiter 122(1) controls what data processor 120(1) provides to input port 132(1) of buffered crossbar switch 103. As indicated by dashed arrow 134, buffered crossbar switch 103 might be configured to provide this data to output port 138(2) of buffered crossbar switch 103. Arbiter 150(2) controls which crosspoint buffer is transferred to output port 138(2) of buffered crossbar switch 103. Thus, buffered crossbar switch 103 provides this data to memory controller 152(2) of memory unit 105. Analogously, dashed arrows 135 and 136 indicate other exemplary data path settings of buffered crossbar switch 103. Buffered crossbar switch 103 might also be set to provide the data from one input port to multiple output ports. Similarly, data from memory controller 152(1) of memory unit 105 might be provided to buffered crossbar switch 104 at input port 148(2). Arbiter 150(1) controls what data memory controller 152(1) provides to input port 148(2) of buffered crossbar switch 104. As indicated by dashed arrow 145, buffered crossbar switch 104 might be set to provide this data to one output, in this instance, output port 142(2), which provides the data to processor 120(2) of processing unit 102. Arbiter 122(2) controls which crosspoint buffer is transferred to output port 142(2) of buffered crossbar switch 104. Analogously, dashed arrows 144 and 146 indicate other exemplary data path settings of buffered crossbar switch 104.

Figure 2:
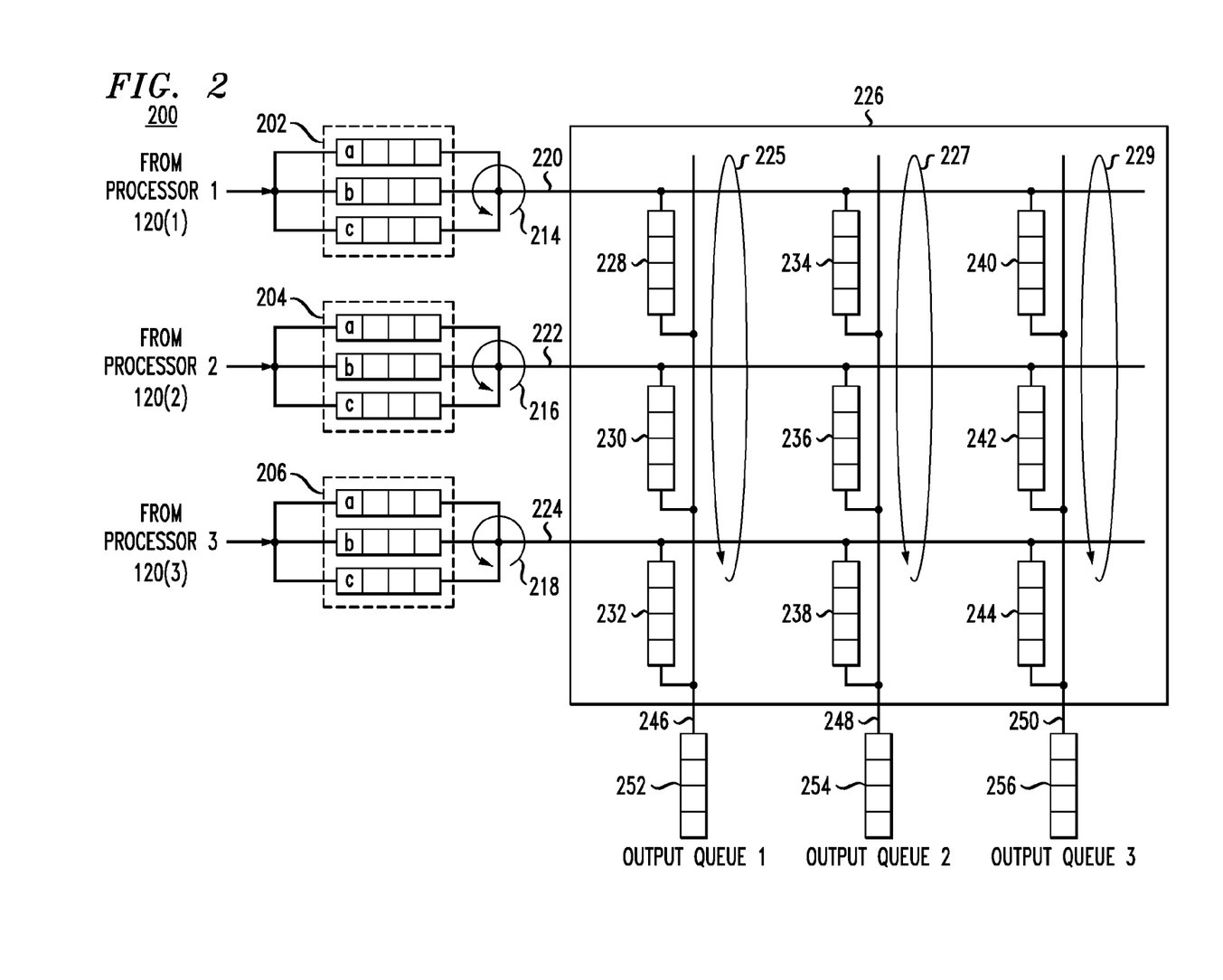
FIG. 2 shows a block diagram of a buffered crossbar switch in accordance with an embodiment of the present invention.

FIG. 2 shows a block diagram of buffered crossbar switch system 200 in accordance with an embodiment of the present invention. As shown, buffered crossbar switch system 200 includes buffered crossbar switch 226 and virtual output queues (VOQs) 202, 204 and 206. Buffered crossbar switch 226 has 3 input ports, shown as input ports 220, 222 and 224, and 3 output ports, shown as output ports 246, 248 and 250. Thus, as shown in FIG. 2, N=M=3. Input port 220 is in electrical communication with VOQ 202, input port 222 is in electrical communication with VOQ 204 and input port 224 is in electrical communication with VOQ 206. Output port 246 is in electrical communication with output queue 1 252, output port 248 is in electrical communication with output queue 2 254 and output port 250 is in electrical communication with output queue M 256. Some embodiments of the present invention might not include output queues 252, 254 and 256. Buffered crossbar switch 226 includes a FIFO buffer at each crosspoint of the 3×3 switch matrix. Thus, in exemplary embodiments, an N×M switch will have N×M buffers. These FIFO buffers are shown in FIG. 2 as crosspoint queues 228, 230, 232, 234, 236, 238, 240, 242 and 244. Crosspoint queues temporarily store data before forwarding the data to the respective output port. Crosspoint queues allow the switch fabric to receive data nearly simultaneously at multiple input ports without blocking.

VOQs 202, 204 and 206 might each include one or more virtual first-in, first-out (FIFO) buffers. For example, VOQ 202 might include three FIFOs, shown in FIG. 2 as FIFOs 202a, 202b and 202c; however, the present invention is not so limited and more or less FIFOs might be employed. Each VOQ buffer is in electrical communication with an arbiter that schedules access by the VOQs to the switch fabric of buffered crossbar switch 226. As shown in FIG. 2, VOQ 202 is in electrical communication with arbiter 214, VOQ 204 is in electrical communication with arbiter 216 and VOQ 206 is in electrical communication with arbiter 218. Although shown in FIG. 2 as VOQs, embodiments of the present invention might employ other types of input buffering.

Packets sent to VOQs 202, 204 and 206 are sorted in FIFOs according to the destination addresses of the packets. Packets generally are of a variable length, thus, embodiments of the present invention segment packets into "cells" before they are provided to the switch fabric. A cell is a fixed number of bits such that packets of varying sizes might be segmented into a number of cells of fixed size, plus padding, if necessary.

Crosspoint queues temporarily store data cells before cells are transferred to corresponding output queue(s). Each crosspoint queue is in electrical communication with an arbiter that schedules access by the crosspoint queues to the output ports of buffered crossbar switch 226. As shown, crosspoint queues 228, 230 and 232 are in electrical communication with arbiter 225, crosspoint queues 234, 236 and 238 are in electrical communication with arbiter 227 and crosspoint queues 240, 242 and 244 are in electrical communication with arbiter 229. Referring back to FIG. 1, arbiters 214, 216, and 218 correspond to arbiters 122(1) through 122(N) and arbiters 225, 227 and 229 correspond to arbiters 150(1) through 150 (M) where N=M=3.

Some embodiments of the present invention include output queues 252, 254 and 256 to reassemble data cells into packets. Output queues 252, 254 and 256 are not needed in embodiments that send packets directly to the switch fabric (i.e. do not segment packets into cells) because no packet reassembly is required.

Some embodiments of the present invention provide that the size of each crosspoint queue (e.g. queue depth) might be variable. Thus, the depth of each crosspoint queue might vary based on, for example, the round-trip time of data transfer through buffered crossbar switches 103 and 104 of FIG. 1. For example, a data path having a long round-trip time might require a larger crosspoint buffer to store data cells during the round-trip transfer of the packet. Thus, embodiments of the present invention provide crosspoint queues of varying depths to support different round-trip times.

Round-trip time is the time required for a credit to return to the input arbiter and the time required to send data to a crosspoint buffer. Initially, all crosspoint buffers are empty. Each input arbiter of the buffered crossbar switch might track how many credits are available for each crosspoint buffer. For example, the number of credits, C, available for each input port i at crosspoint buffer i,j might be represented as $C(i,j)$. The number of credits might initially be equal to the depth of crosspoint buffer i,j. For each data cell sent to crosspoint buffer i,j from input port i, the number of credits, C, is decremented. When $C(i,j)$ is zero, input port i must stop sending data cells, or else crosspoint buffer i,j will overflow. When the output arbiter at output j pulls a cell from crosspoint buffer $(i,j)$, $C(i,j)$ is incremented ("returning a credit"). For example, in a system where it takes two cycles for an input to write to a crosspoint buffer and three cycles to return a credit, the round-trip time is 5 cycles. With a deeper crosspoint buffer, the input can keep sending cells into the crosspoint buffer without exhausting its credits. In exemplary embodiments of the present invention, the depth of the crosspoint buffer might increase as credit return latency, and thus round-trip time, increases.

Input arbiters 214, 216 and 218 are distributed arbiters because each of N input FIFO buffers 202, 204 and 206 has one arbiter. Input arbiters are not in electrical communication with each other, thus facilitating scalability of buffered crossbar switch 226, since distributed arbiters might have a smaller physical size than a centralized arbiter. Similarly, output arbiters 225, 227 and 229 are also distributed arbiters because each of the M output queues 252, 254 and 256 has one arbiter.

Arbiters 214, 216, 218, 225, 227 and 229 are, for exemplary embodiments, implemented as "round-robin" schedulers implementing a round-robin algorithm: buffers are processed in ascending or descending order, and the process returns to the first buffer in the sequence after the last buffer in the sequence is served. For example, as each one of non-empty VOQs 202a, 202b and 202c is served by arbiter 214, data cells in the serviced buffer are provided to the switch fabric until the currently serviced VOQ becomes empty or the timeslot for the VOQ is over. Either such occurrence causes arbiter 214 to advance to the next VOQ in the sequence. Arbiter 214 skips empty VOQs to serve the next non-empty VOQ. Arbiters 216, 218, 225, 227 and 229 operate similarly as arbiter 214. Although a round-robin scheduling algorithm is described, the present invention is not so limited, and other scheduling algorithms might be employed, for example longest queue first scheduling wherein the queue that has held data for the longest time is given scheduling priority. Further, embodiments of the present invention provide input and output arbiters that do not necessarily employ the same scheduling algorithm and a combination of scheduling algorithms might be employed.

Generally, arbitration is performed as described above. Thus, if buffered crossbar switch 226 has an equal number, N, of inputs and outputs, a packet consisting of Z cells, where Z is an integer, might take N×Z clock cycles to reach the destination output queue. Exemplary embodiments of the present invention provide for cell prioritization. For example, priority might be assigned on a processor basis, wherein certain processors within processing unit 102 might be assigned higher priority than other processors, such that the associated arbiter would deliver all Z cells of a packet consecutively in Z cycles. Alternatively, priority might be assigned on a packet basis, wherein, for example, certain types of packets might be assigned higher priority than other types of packets.

Non-uniform output occurs with repeated access of a particular output port of buffered crossbar switch 226. Non-uniform output might limit the maximum throughput of buffered crossbar switch 226 since access to the output port is controlled by the output arbiter. For example, as shown in FIG. 1, each output port of buffered crossbar switch 226 corresponds to particular memory controller within memory unit 105. Typically, data transfer of a block of memory having sequential addresses is managed by one memory controller. The destination memory address determines which output of the buffered crossbar switch 226 is accessed. Thus, sequential memory accesses might cause a non-uniform output condition to arise, which might limit the maximum throughput of buffered crossbar switch 226. Some embodiments of the present invention scramble memory addresses before passing data for such addresses through buffered crossbar switch 226. Scrambling of memory addresses translates sequential memory accesses into accesses having a more uniform distribution of output port accesses.

Figure 3:
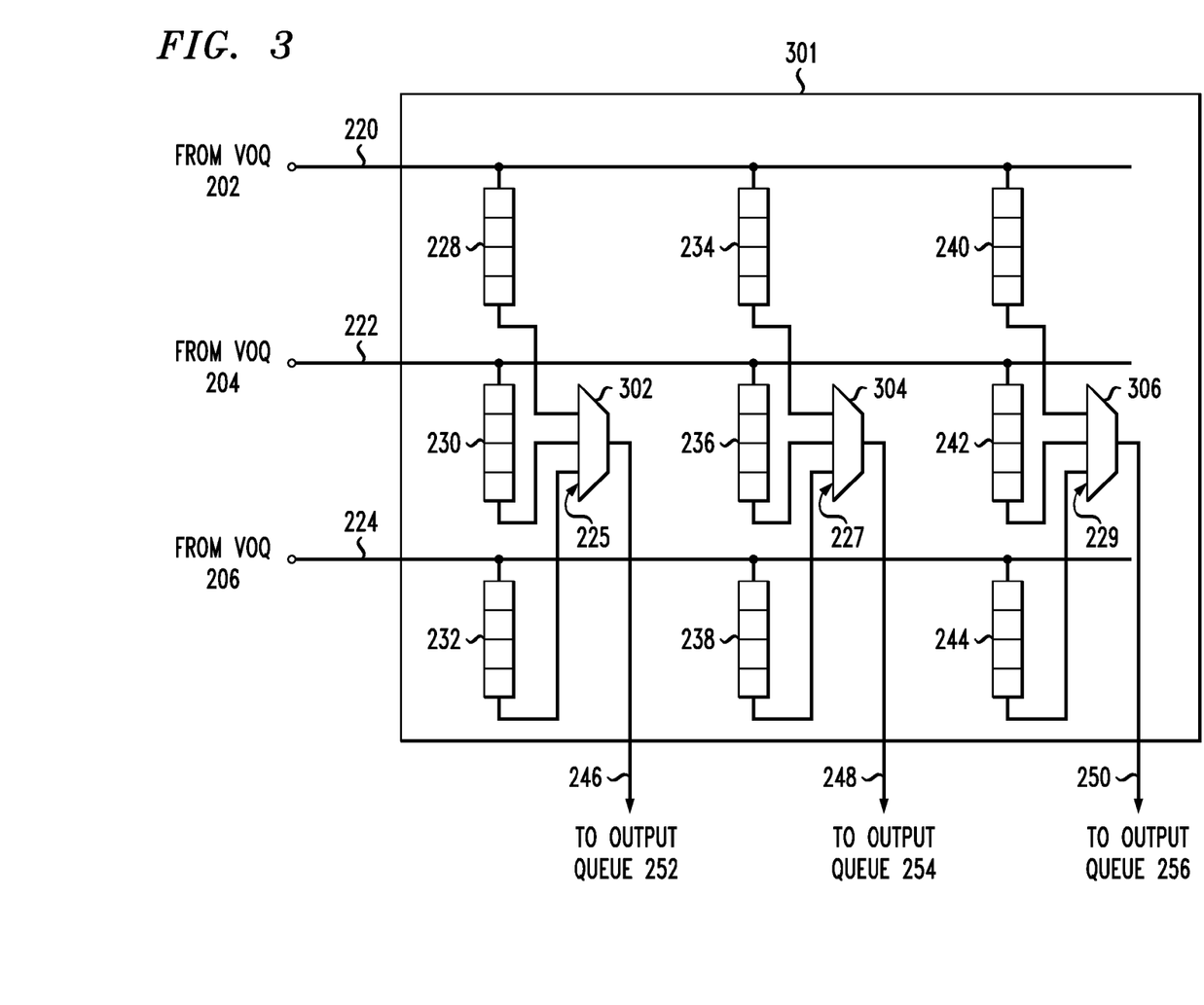
FIG. 3 shows additional detail of the buffered crossbar switch of FIG. 2.

FIG. 3 shows additional detail of the buffered crossbar switch system of FIG. 2. As shown in FIG. 3, exemplary embodiments of buffered crossbar switch 301 additionally include M multiplexers, shown as 302, 304 and 306, where M is the number of outputs of the crossbar switch. As shown in FIG. 3, N=M=3. For a switch having N inputs and M outputs, the switch fabric of buffered crossbar switch 301 might include M "N-to-1" multiplexers. As shown, arbiter 225 and crosspoint queues 228, 230 and 232 are in electrical communication with multiplexer 302. Arbiter 225 controls which of the crosspoint queues is asserted by multiplexer 302 to output port 246, thus accessing output queue 252. Similarly, crosspoint queues 234, 236 and 238 are in electrical communication with multiplexer 304. Arbiter 227 controls which of the crosspoint queues is asserted by multiplexer 304 to output port 248, thus accessing output queue 254. Crosspoint queues 240, 242 and 244 are in electrical communication with multiplexer 306. Arbiter 229 controls which of the crosspoint queues is asserted by multiplexer 306 to output port 250, thus accessing output queue 256.

Figure 4:
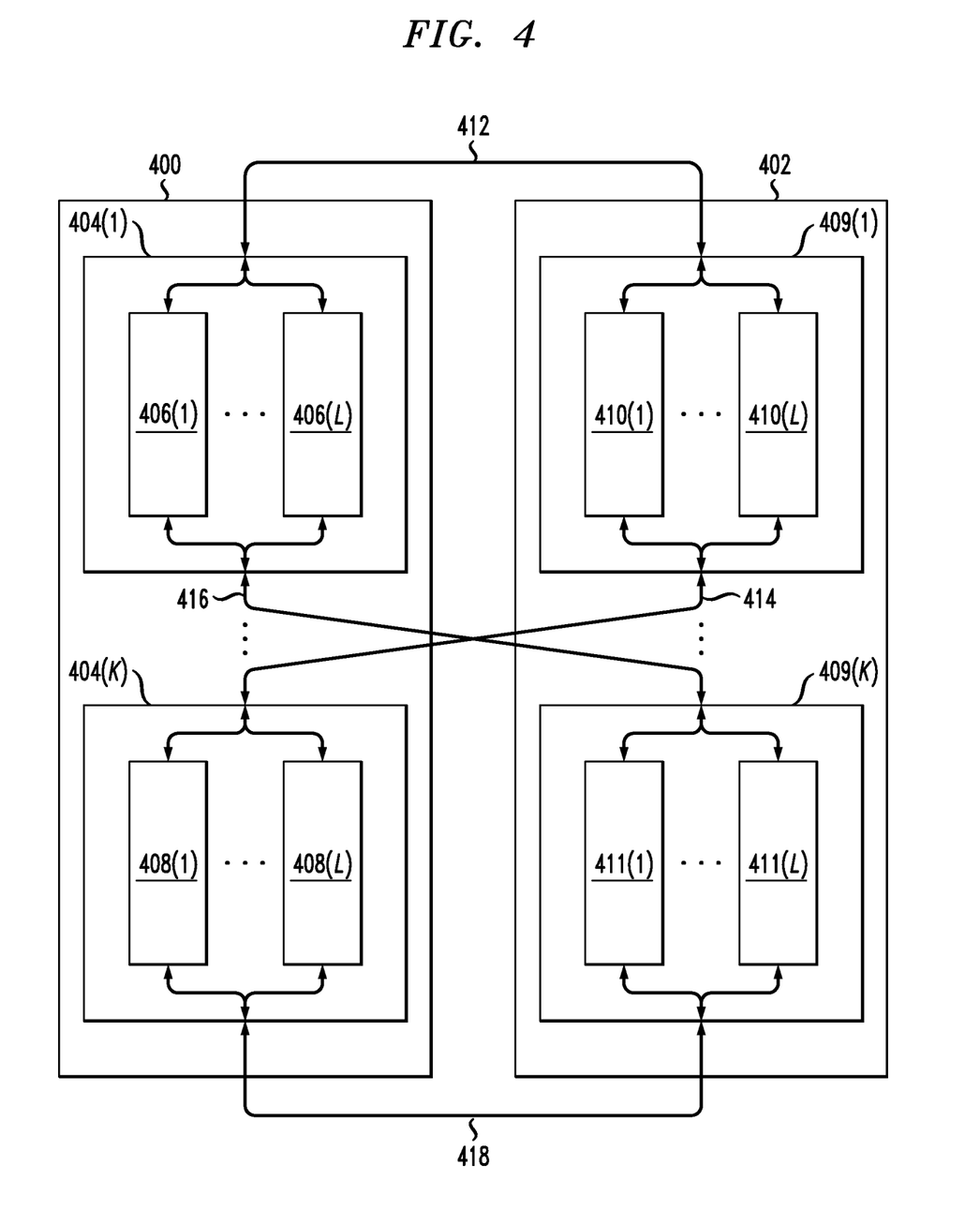
FIG. 4 shows another buffered crossbar switch system operating in accordance with exemplary embodiments of the present invention.

While described above as being implemented as a monolithic chip, the present invention is not so limited. For example, as shown in FIG. 4, each buffered crossbar switch might occupy its own circuit board, shown as switch cards 406(1) through 406(L). Multiple switch cards might occupy a shelf, with multiple shelves, shown as shelves 404(1) through 404(K), forming switch chassis 400. Similarly, the processors and memories might be located on line chassis 402. Line chassis 402 might include multiple shelves, shown as shelves 409(1) through 409(K), each shelf including multiple line cards, shown as line cards 410(1) through 410(L). Each line card might contain devices, such as memory or processors, which communicate via the switch cards. A line chassis typically communicates with a switch chassis via electrical cables or optical links, shown as links 412, 414, 416 and 418.

Figure 5:
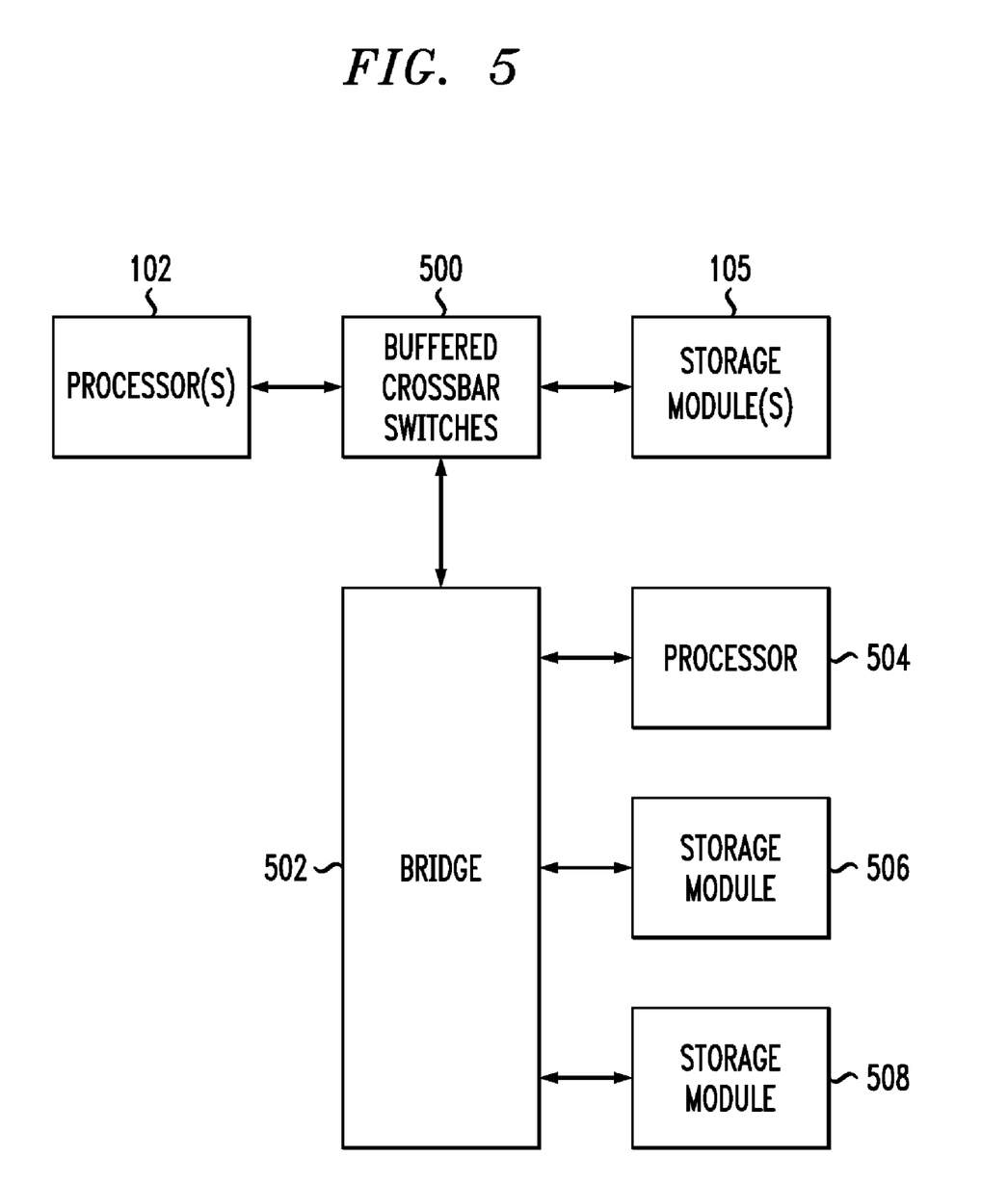
FIG. 5 shows another buffered crossbar switch system operating in accordance with exemplary embodiments of the present invention; and, FIG. 6 shows another buffered crossbar switch system operating in accordance with exemplary embodiments of the present invention.

FIG. 5 shows another buffered crossbar switch system operating in accordance with exemplary embodiments of the present invention. As shown in FIG. 5, one or more buffered crossbar switches, shown as 500, might be used to make a chain of processors 102 and storage modules 105 where a storage module might serve as a buffer for two processors to communicate with each other. Buffered crossbar switches 500 operate as described with regard to FIG. 1. Buffered crossbar switches 500 might also be in electrical communication with bridge 502, thus, creating a branch along the chain. Bridge 500 might have one high-bandwidth port for communication with buffered crossbar switches 500, and lower bandwidth ports for communication with slower or legacy data modules, shown as processor 504 and storage modules 506 and 508. Thus, embodiments of the present invention provide a way for slower data modules to communicate with faster data modules without limiting the system bandwidth available to the faster data modules. Bridge 502 might employ buffered crossbar switches as described above, or might employ a design that doesn't use buffered crossbar switches.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "electrical communication," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

We claim:

1. Apparatus for transferring data between data modules, each of said data modules being at least one of a data processing module and a data storage module, the apparatus comprising:
   at least one pair of crossbar switches, wherein input nodes and output nodes of each of the crossbar switches are coupled to corresponding ones of the data modules, a first crossbar switch having an N-input node by M-output node switch fabric, and a second crossbar switch having an M-input node by N-output node switch fabric, where N and M are each positive integers greater than one, wherein N and M are not equal, and wherein each crossbar switch comprises:
      an input buffer at each input node having an input arbiter configured to read data packets from each input node to one or more corresponding crosspoint buffers in accordance with a first scheduling algorithm;
      one crosspoint buffer at each crosspoint of the switch fabric, the crosspoint buffer providing a queue having an output arbiter configured to read data packets from the crosspoint buffer queue to an output node corresponding to the crosspoint buffer in accordance with a second scheduling algorithm, wherein, for each crosspoint buffer queue a depth of the queue varies in accordance with a round-trip time of data transfer through the at least one pair of crossbar switches; and each output node configured to receive segments of data packets provided from one or more corresponding crosspoint buffers, wherein, when a data storage module employs sequential addressing of locations in memory, addresses of the locations in memory are scrambled before passing the data through the at least one crossbar switch, and wherein the first crossbar switch directs data from a group of data processing modules to a group of data storage modules, the second crossbar switch directs data from the data storage modules to the data processing modules, each data processing module has a first arbiter that controls a data processing module to transfer data to the input node of the first crossbar switch, and each data storage module has a second arbiter that controls a data memory controller to transfer data to the input node of the second crossbar switch.

2. The invention as recited in claim 1, further comprising an output buffer at each output node, the output buffer configured to store segments of data packets provided from one or more corresponding crosspoint buffers.

3. The invention as recited in claim 1, wherein the input buffer at each input node further comprises one of: a first-in, first-out (FIFO) buffer, a virtual output queue (VOQ), or a push-in, first-out buffer (FIFO).

4. The invention as recited in claim 1, wherein at least one of the first scheduling algorithm and the second scheduling algorithm use a round-robin scheduling algorithm.

5. The invention as recited in claim 4, wherein the round-robin scheduling algorithm of at least one of the first scheduling algorithm and the second scheduling algorithm employs priority delivery for one or more data processing modules.

6. The invention as recited in claim 1, wherein the N-input node by M-output node switch fabric comprises M inter-coupled N-to-1 multiplexers.

7. The invention as recited in claim 1, wherein, the packet of data provided to the input buffer is partitioned into equal length cells.

8. The invention as recited in claim 7, wherein the input buffer is a first-in, first-out (FIFO) buffer.

9. The invention as recited in claim 1, wherein, the apparatus is implemented in a monolithic integrated circuit chip.

10. The invention as recited in claim 1, wherein the apparatus comprises at least five crossbar switches: a first crossbar switch for transfer of address data from a data processing module to a data storage module, a second crossbar switch for transfer of user data from the data processing module to the data storage module, a third crossbar switch for transfer of address data from the data storage module to the data processing module, a fourth crossbar switch for transfer of user data from the data storage module to the data processing module, and a fifth crossbar switch for transfer of responses from the data storage module to the data processing module.

11. A method of transferring data between data modules, each of said data modules being at least one of a data processing module and a data storage module, the method comprising:

scrambling, when a data storage module employs sequential addressing of locations in memory, addresses of the locations in memory;

passing the data through at least one pair of crossbar switches, wherein input nodes and output nodes of each of the crossbar switches are coupled to corresponding ones of the data modules, a first crossbar switch having an N-input node by M-output node switch fabric, and a second crossbar switch having an M-input node by N-output node switch fabric, where N and M are each positive integers greater than one, wherein N and M are not equal, directing, by the first crossbar switch, data from a group of data processing modules to a group of data storage modules, and directing, by the second crossbar switch, data from the data storage modules to the data processing modules, wherein each data processing module has a first arbiter that controls a data processing module to transfer data to the input node of the first crossbar switch, and each data storage module has a second arbiter that controls a data memory controller to transfer data to the input node of the second crossbar switch;

wherein each crossbar switch performs the steps of:

reading, from an input buffer at each input node having an input arbiter, data packets from each input node to one or more corresponding crosspoint buffers in accordance with a first scheduling algorithm;

reading, from an output arbiter of a crosspoint buffer at each crosspoint of the switch fabric, the crosspoint buffer having a queue with an output arbiter, data packets from the crosspoint buffer queue to an output node corresponding to the crosspoint buffer in accordance with a second scheduling algorithm;

varying, for each crosspoint buffer queue a depth of the queue in accordance with a round-trip time of data transfer through the at least one pair of crossbar switches; and receiving, at an output node, segments of data packets from one or more corresponding crosspoint buffers.

12. The invention as recited in claim 11, further comprising partitioning the packet of data provided to the input buffer into equal length cells.

13. A machine-readable storage medium, having encoded thereon program code, wherein, when the program code is executed by a machine, the machine implements a method for transferring data between data modules, each of said data modules being at least one of a data processing module and a data storage module, comprising the steps of:

scrambling, when a data storage module employs sequential addressing of locations in memory, addresses of the locations in memory;

passing the data through at least one pair of crossbar switches, wherein input nodes and output nodes of each of the crossbar switches are coupled to corresponding ones of the data modules, a first crossbar switch having an N-input node by M-output node switch fabric, and a second crossbar switch having an M-input node by N-output node switch fabric, where N and M are each positive integers greater than one, wherein N and M are not equal, directing, by the first crossbar switch, data from a group of data processing modules to a group of data storage modules, and directing, by the second crossbar switch, data from the data storage modules to the data processing modules, each data processing module has a first arbiter that controls a data processing module to transfer data to the input node of the first crossbar switch, and each data storage module has a second arbiter that controls a data memory controller to transfer data to the input node of the second crossbar switch;

wherein each crossbar switch performs the steps of:
  reading, from an input buffer at each input node having an input arbiter, data packets from each input node to one or more corresponding crosspoint buffers in accordance with a first scheduling algorithm;
  reading, from an output arbiter of a crosspoint buffer at each crosspoint of the switch fabric, the crosspoint buffer having a queue with an output arbiter, data packets from the crosspoint buffer queue to an output node corresponding to the crosspoint buffer in accordance with a second scheduling algorithm;
  varying, for each crosspoint buffer queue a depth of the queue in accordance with a round-trip time of data transfer through the at least one pair of crossbar switches; and
  receiving, at an output node, segments of data packets from one or more corresponding crosspoint buffers.

* * * * *